Figure 1:
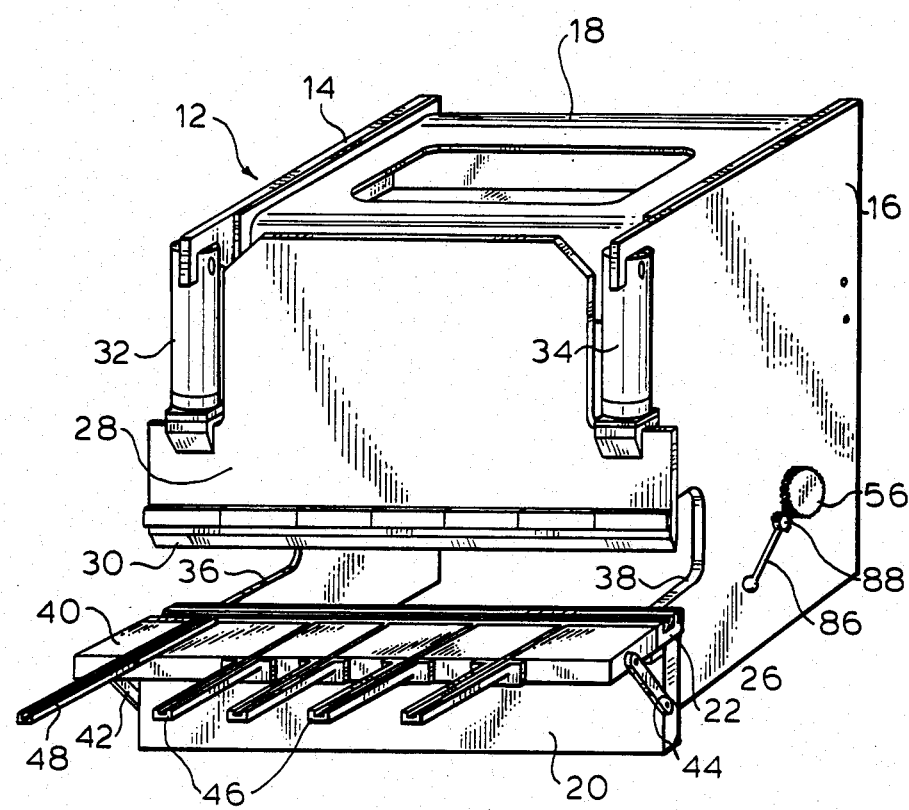

United States Patent [19]

Ebrahimian

[11] Patent Number: 4,646,420
[45] Date of Patent: Mar. 3, 1987

[54] COMBINED BENDING AND CUTTING MACHINE FOR METAL PLATE

[76] Inventor: Ebrahim Ebrahimian, 1589 Phillbrook Drive, London, Ontario N5X 2S4, Canada

[21] Appl. No.: 796,340

[22] Filed: Nov. 12, 1985

[51] Int. Cl.$^4$ .................. B21D 5/01; B23P 23/00
[52] U.S. Cl. ...................................... 29/560; 72/324; 72/464; 83/552
[58] Field of Search ................ 29/560, 560.1; 72/324, 72/464, 389, 442; 83/552, 564, 598, 599, 699, 200

[56] References Cited

U.S. PATENT DOCUMENTS

| 3,616,525 | 11/1971 | Barthel | 29/560 |
| 3,875,655 | 4/1975 | Gerlach | 29/560 |
| 4,506,433 | 3/1985 | Gingras | 29/560 |

Primary Examiner—Z. R. Bilinsky
Attorney, Agent, or Firm—Robert F. Delbridge; Arne I. Fors

[57] ABSTRACT

A combined bending and cutting machine suitable for bending and cutting metal plate has a female bending die holder extending transversely across a lower part of the frame and supported thereby, the female die holder having a transversely extending upwardly-open recess for receiving a female bending die. A male bending die holder is mounted on the frame above the female die holder for vertical movement relative to the frame and female die holder. The male die holder is moved vertically towards and away from the female die holder to bend a metal plate positioned between the male and female bending dies. A transversely extending clamping member above the female die holder is movable towards and away from said female die holder, the clamping member carrying a plurality of fluid-pressure-operated clamping devices operable to clampingly engage a metal plate mounted on the female die holder when the clamping member has been moved towards the female die holder. A shear is mounted for pivotal movement relative to the frame behind the clamping member and comprises a transversely extending cutting member with a first cutting edge. The female bending die holder has a second transversely extending cutting edge at the rear thereof, and the shear operates by moving the cutting member downwardly to cause the first cutting edge to engage the metal plate behind the clamping devices, when the clamping devices are clampingly engaged with the metal plate, and cooperate with the second cutting edge to cut through the metal plate.

5 Claims, 9 Drawing Figures

COMBINED BENDING AND CUTTING MACHINE FOR METAL PLATE

This invention relates to machines for bending and cutting metal plate.

Metal plate may have a thickness of up to about 1" (2.5 cm) or possibly somewhat thicker, and metal plate of such thickness is clearly more difficult to bend and cut than sheet metal which may have a thickness of up to about 0.25" (0.625 cm). In the past, separate machines have usually been provided for bending (commonly known as press brakes) and for cutting metal plate (commonly known as shears). This is expensive because two machines of considerable size have to be purchased together with related accessories such as feed tables. Combined bending and cutting machines have been proposed, but such prior proposals have usually been only suitable for sheet metal or have not been suitable for use in an automated operation.

It is therefore an object of the present invention to provide a combined bending and cutting machine which is not only useful for metal plate but which is also suitable for use in an automated operation.

According to the present invention, a combined bending and cutting machine suitable for bending and cutting metal plate comprises a frame, a female bending die holder extending transversely across a lower part of the frame and supported thereby, the female die holder having a transversely extending upwardly-open recess for receiving a female bending die, and a female bending die located in the recess. A male bending die holder is mounted on the frame above the female die holder for vertical movement relative to the frame and female die holder, a male bending die is mounted on a lower end of the male die holder, and means are provided for effecting vertical movement of the male die holder towards and away from the female die holder to bend metal plate positioned between the male and female bending dies.

The machine in accordance with the invention also includes clamping means mounted for movement relative to the frame, means for effecting said movement to the clamping means, the clamping means having a transversely extending clamping member above the female die holder and movable by said moving means towards and away from the female die holder, and the clamping member carrying a plurality of fluid-pressure-operated clamping devices operable to clampingly engage a metal plate positioned on the female die holder when the clamping member has been moved towards the female die holder.

The machine also includes shearing means mounted for pivotal movement relative to the frame behind the clamping means, means for effecting the pivotal movement of the shear means, the shear means having a transversely extending cutting member with a first cutting edge, and the female die holder having a second transversely extending cutting edge at the rear thereof, the shear pivoting means being operable to move the cutting member downwardly to cause the first cutting edge to engage the metal plate behind the clamping devices, when the clamping devices are clampingly engaged with the metal plate, and cooperate with the second cutting edge on the female bending die holder to cut through the metal plate.

A machine in accordance with the inventions is able to bend and cut metal plate with only minimal movement of the metal plate, and thus is specially suitable for use in an automated operation.

The clamping means may be mounted for pivotal movement related to the frame, and the clamping means and the shear means may be mounted for pivotal movement about a common pivotal axis. Alternatively, the clamping means may be mounted for substantially vertical movement relative to the frame.

The shear means may be mounted for pivotal movement on the frame by adjustable eccentric pivoting means which is adjustable to vary the position of the first cutting edge on the transverse cutting member in accordance with the thickness of the metal plate to be cut.

Figure 2:
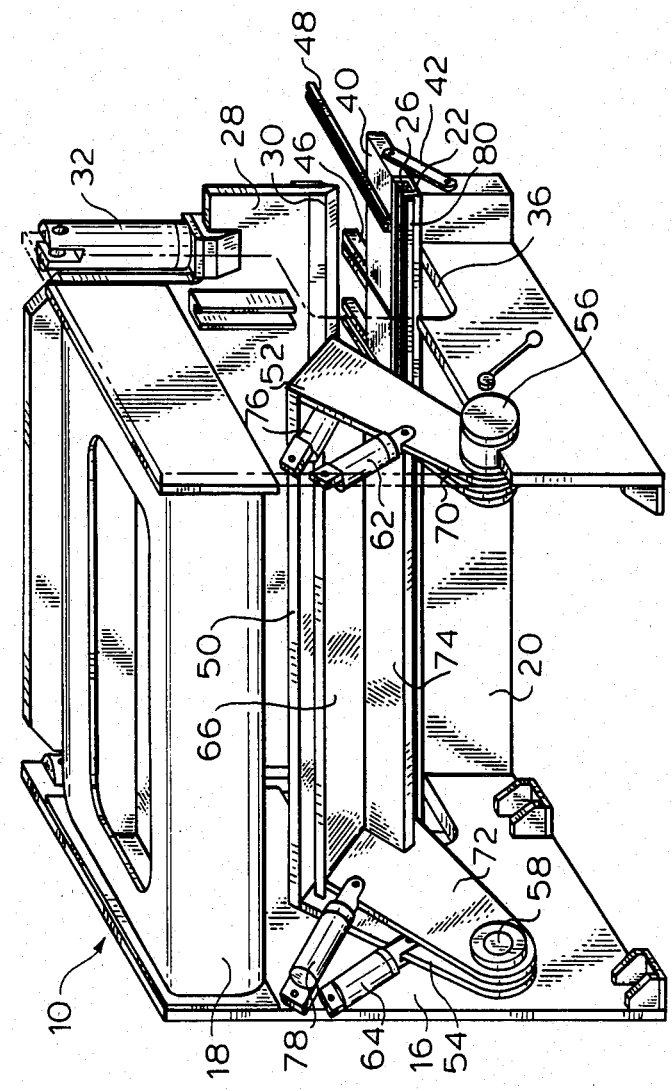
Figure 3:
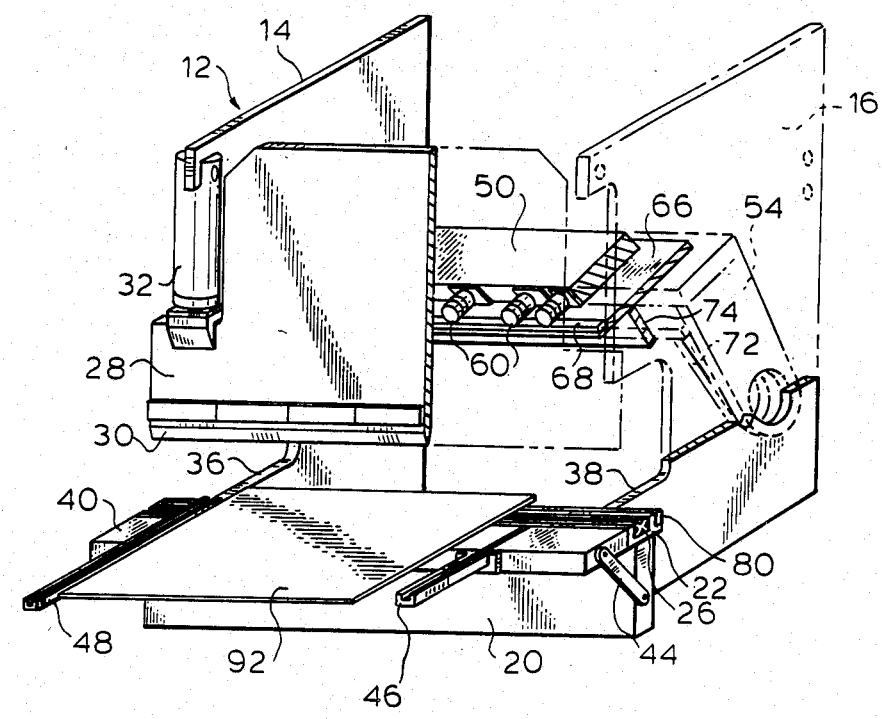
Figure 4:
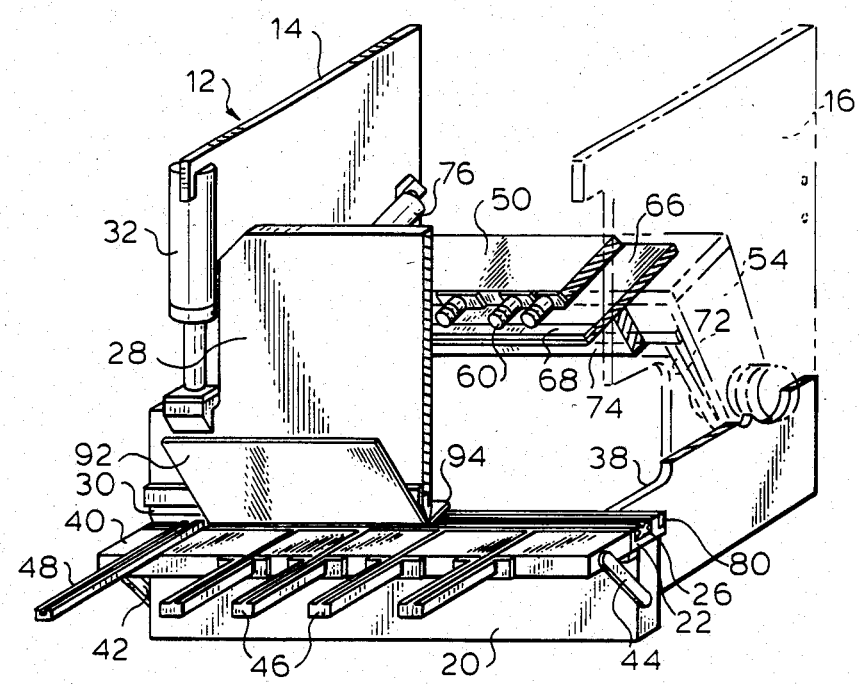
Figure 5:
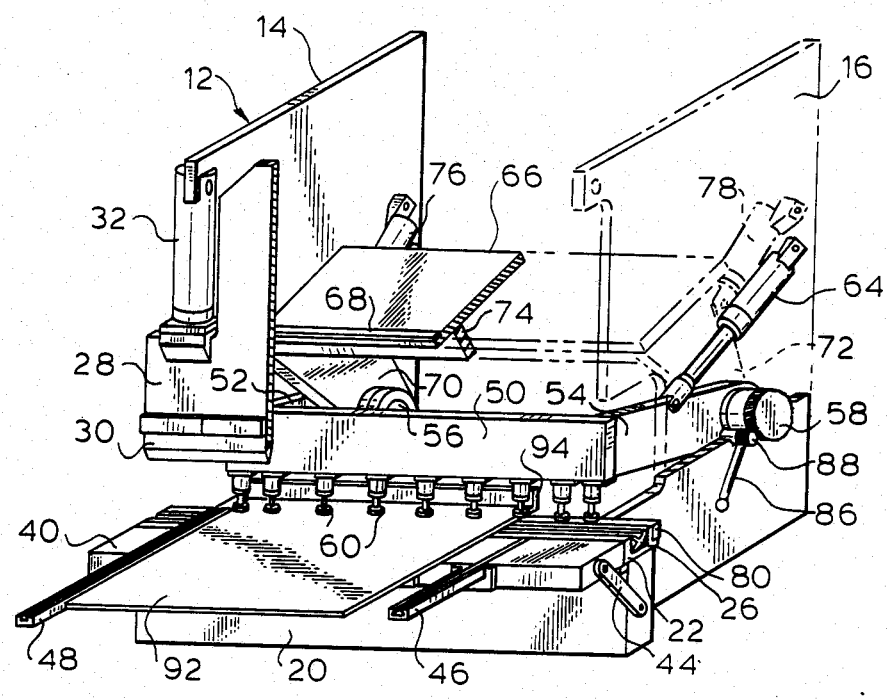
Figure 6:
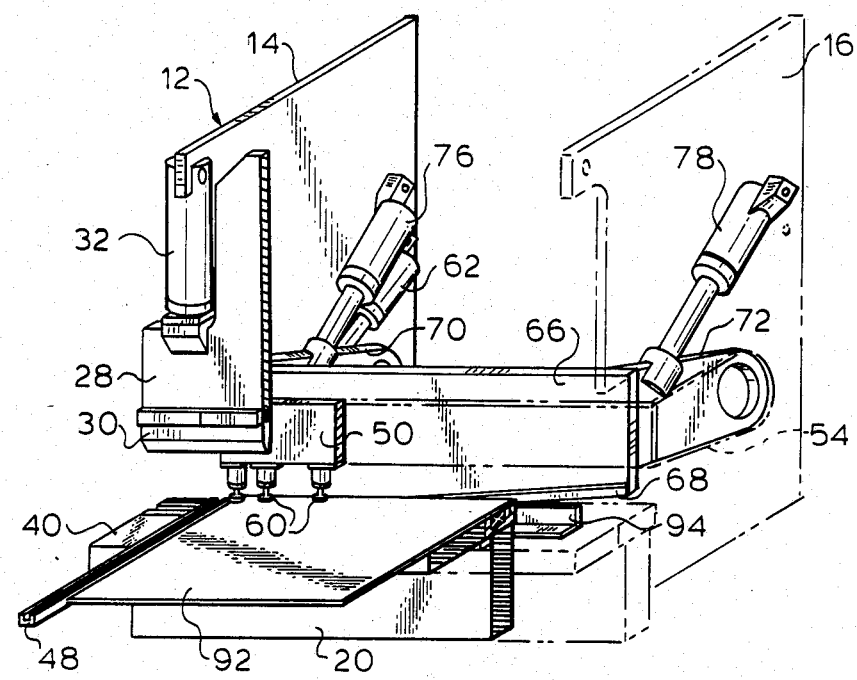
Figure 7:
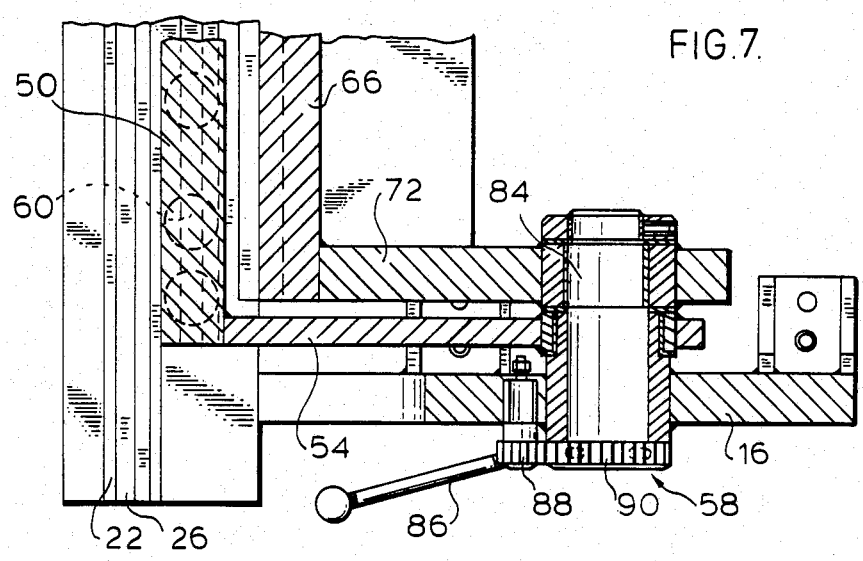
Figure 8:
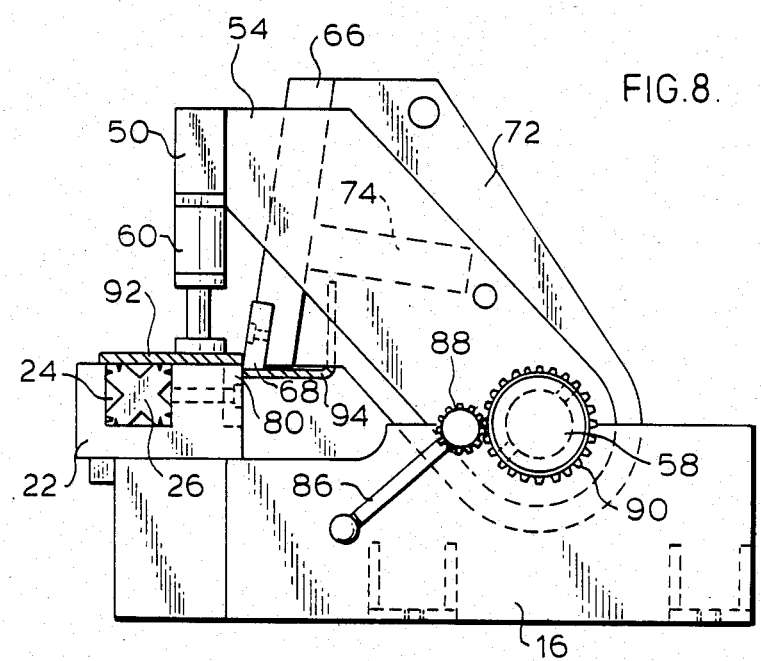
Figure 9:
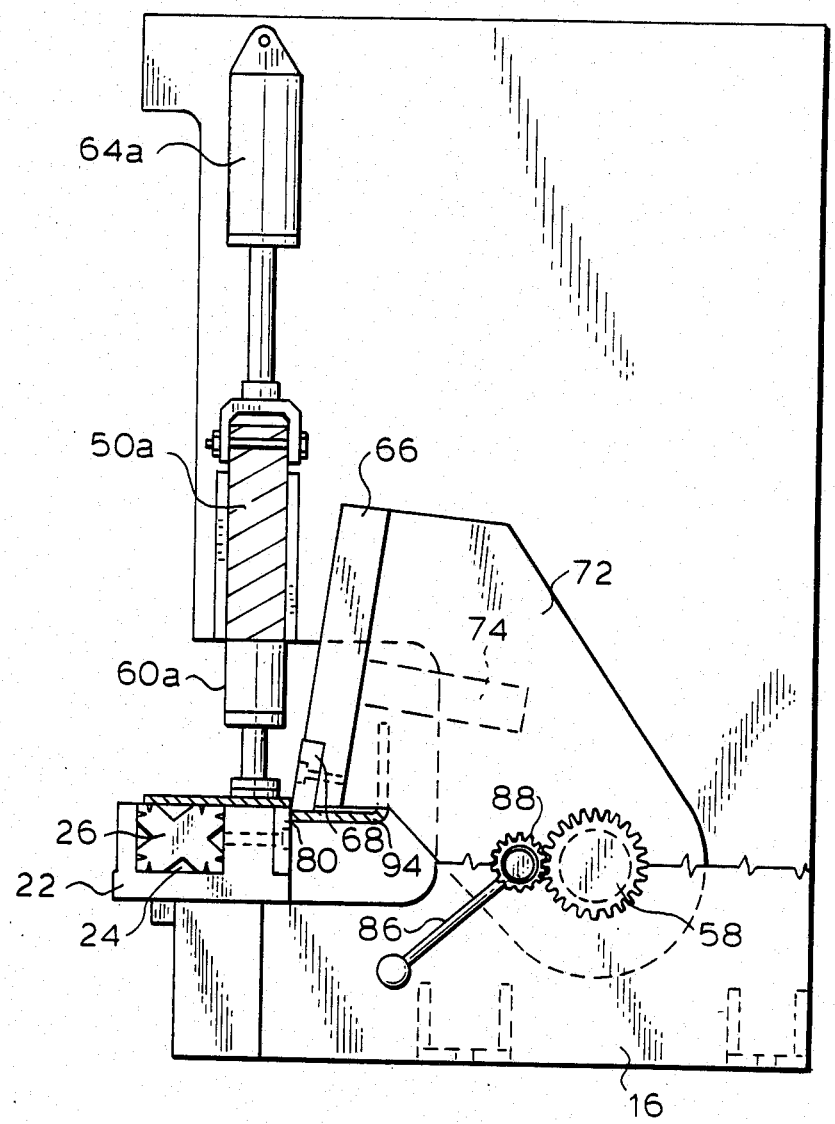

Embodiments of the invention will now be described, with reference to the accompanying drawings, of which:

FIG. 1 is a front perspective view of a combined bending and cutting machine for metal plate in accordance with one embodiment of the invention, FIG. 2 is a rear perspective view of the machine, FIG. 3 is a front view similar to FIG. 1 but with parts broken away to show the clamping means and the shearing means, and also showing a metal plate in position for a bending operation, FIG. 4 is a view similar to FIG. 3 but showing the metal plate being bent, FIG. 5 is a similar view showing the bent plate being clamped, FIG. 6 is a similar view showing the bent and clamped plate being cut, FIG. 7 is a fragmentary horizontal sectional view of the eccentric pivotal mounting of the clamping means, FIG. 8 is a fragmentary side view of parts shown in FIG. 7 and also showing the bent and clamped plate being cut, and FIG. 9 is a view similar to FIG. 8 but showing clamping means in accordance with another embodiment of the invention.

Referring to the drawings, a combined bending and cutting machine for metal plate has a frame 12 with side walls 14, 16, a transverse upper frame member 18 extending between upper portions of the side walls, and a short vertical front frame member 20 extending across the front of the lower end portions of the side walls 14, 16.

A female bending die holder 22 is mounted on top of the front frame member 20 and extends transversely across the front of the frame 12. A female die holder 22 has a transversely extending upwardly-open recess 24 which receives a female bending die 26. A male die holder in the form of a plate-like member 28 is positioned in a vertical plane at the front of the frame 12 above the female die holder 22, and has a male bending die 30 extending along its lower edge. A male die holder 28 is secured to the lower ends of two transversely-spaced hydraulic rams 32, 34 whose upper ends are pivotally secured to the frame side walls 14, 16 respectively. The front edge of each side wall 14, 16 is recessed at 36, 38 respectively behind the female die holder 22 and behind the lower part of the male die holder 28 to accommodate metal plate being bent and cut as will be described in more detail later.

A work table 40 is mounted in front of the female die holder 28 by pivoting links 42, 44 at opposite sides extending between the table 40 and the front frame member 20. A series of beams 46 extend forwardly from the table 40 to assist in supporting the metal plate, with an end beam 48 acting as an edge guide. The table 40 is moveable between a raised position as shown in FIG. 1 and lower positions by small hydraulic jacks (not shown). Clamping means are located behind the female and male die holders 22, 28 and include a transversly extending clamping member 50 having support arms 52, 54 at opposite sides, support arms 52, 54 being pivotally mounted on bearings 56, 58 in the frame side walls 14, 16 respectively. The clamping member 50 carries a series of hydraulic ram clamps 60 along its lower edge. The clamp support arms on 52, 54 are pivotally connected to the lower ends of two transversely-spaced hydraulic rams 62, 64 whose upper ends are pivotally connected to frame side walls 14, 16 respectively.

Shearing means include a transversely extending cutting member 66 located behind the clamping member 50 and having a first cutting edge 68. The cutting member 66 has support arms 70, 72 located transversely inwardly of the clamp support arms 52, 54 and also pivotally mounted on bearings 56, 58. The shearing means also has a reinforcing member 74 extending between the support arms 70, 72 behind the cutting member 66. The shear support arms 70, 72 are pivotally connected to the lower ends of two transversely-spaced hydraulic rams 76, 78 whose upper ends are pivotally connected to frame side walls 14, 16 respectively. The rear edge of the female die holder 22 carries a transversely extending second cutting edge 80 which cooperates with the first cutting edge 68 as will be described in more detail later.

As previously described, the clamping means and the shear means are mounted on the same bearings 56, 58 for pivotal movement about the same horizontal axis. As shown in FIGS. 7 and 8, the bearing 58 comprises a bearing pin 82 on which the clamp support arm 54 and the shear support arm 72 are pivotally mounted. The clamp support arm 54 is concentrically mounted, but the shear support arm 72 is mounted on an eccentric end portion 84 of the pin 82. The angular orientation of the bearing pin 82 can be adjusted by manually-operable lever 86 which extends from an angularly adjustable tooth gear 88 mounted on the frame side wall 16 and engaging a tooth portion at the outer end of bearing pin 82. The bearing 56 is similarly constructed. By adjusting the positions of the levers 86 on opposite sides of the frame, the resultant change in angular orientation of the eccentric pin portion 84 adjusts the position of the shear means so that appropriate adjustments in shear position in accordance with the thickness of a metal plate to be cut can be made.

In use, a metal plate 92 is positioned on the work able 40 with the rear portion of the plate being supported by support beams 46 and with one side edge of the plate abutting the guide beams 48. A front portion of the metal plate extends across and beyond the female die holder 22. At this stage, the male die holder 28, the clamping member 50 and the shear member 66 are all in the raised position as shown in FIG. 3. It will of course be understood that the various hydraulic rams are suitably connected to a source of hydraulic fluid pressure and that appropriate control valves are provided to effect extension and contraction of the hydraulic rams when required, as will be readily apparent to a person skilled in the art. Such hydraulic controls may be manually or automatically operated.

Rams 32, 34 are then extended to move the male die holder 28 downwardly so that the male die 30 engages the plate 92 and cooperates with the female die 26 to bend the leading end portion 94 of the plate so that it extends perpendicularly to the remainder of the plate. As will also be readily understood by persons skilled in the art, the frame side walls 14, 16 may carry guides which cooperate with the male die holder 28 to cause the male die holder 28 to travel in the intended vertical plane. After the bending operation, rams 32, 34 are retracted to raise the male die holder 28, and the metal plate 92 is pushed further into the machine to position the plate for subsequent cutting of the angled portion 94 from the remainder of the plate 92.

Rams 62, 64 are then extended to lower the clamp member 50 to the position shown in FIG. 5, and clamp rams 60 are extended to firmly clamp the plate 92 against the female die holder 22, as shown more clearly in FIG. 8. Rams 76, 78 are then extended to move cutting member 66 downwardly and cause the first cutting edge 68 to engage plate 92 and cooperate with second cutting edge 80 to shear the angled portion 94 from the remainder of the plate 92, as also shown in FIG. 8. Handles 86 will of course have been previously adjusted to correctly position shear member 66 by adjustment of the eccentric bearings 56, 58 in accordance with the thickness of the plated 92 to be cut. The cut angle portion 94 falls downwardly between the frame side wall 14, 16 to an appropriate receiving station (not shown). Shear rams 76, 78 and clamp rams 60, 62, 64 are then retracted to ready the machine for the next operation.

As shown in FIG. 9, the clamping means may be mounted for vertical movement relative to the frame instead of pivotal movement. In this case, the transversely spaced rams (of which ram 64a is shown) are vertically mounted behind the male die holder 28, their upper ends being pivotally connected to respective frame walls 14, 16 and their lower ends being pivotally connected to transversely extending clamping member 50a which moves vertically between guides 51, 53 extending between the frame walls 14, 16. As before, the clamping member 50a carries a series of hydraulic ram clamps 60a along its lower edge. Otherwise, the machine operates in the manner previously described.

The advantages of the invention will be readily apparent from the foregoing description of preferred embodiments. The described machine can readily bend metal plate up to a thickness of about 2" (5 cm), and can cut metal plate up to a thickness of about 1.25" (3.2 cm). The plate 92 has only to be moved a minimal amount between bending and shearing operations. It will be observed that the female die holder 22 also acts as an anvil during the shearing or cutting operation. A machine in accordance with the present invention replaces conventional separate bending machines (press brakes) and shear machines, thereby saving the expense of requiring two machines. Further, it will be readily apparent that the machine in accordance with the present invention can readily be incorporated into an automated production operation.

Other advantages of the invention will be readily apparent to a person skilled in the art, the scope of the invention being defined in the appended claims.

What I claim as new and desire to protect by Letters Patent of the United States is:

1. A combined bending and cutting machine suitable for bending and cutting metal plate comprising a fixed frame, a female bending die holder extending transversely across a lower part of the frame and fixedly supported thereby, said female die holder having a transversely extending upwardly-open recess for receiving a female bending die, a female bending die located in the recess, a male bending die holder mounted on the frame above the female die holder for vertical movement relative to the frame and female die holder, a male bending die mounted on a lower end of the male die holder, means for effecting vertical movement of the male die holder towards and away from the female die holder to bend a metal plate positioned between the male bending die and the female bending die in the recess, clamping means operable separately from said male bending die holder and mounted for movement relative to the frame, means for effecting said movement of the clamping means independently of movement of the male bending die holder, the clamping means having a transversely extending clamping member behind said male bending die holder and above the female die holder and movable by said moving means towards and away from said female die holder, said clamping member carrying a plurality of fluid-pressure-operated clamping devices extendable to clampingly engage a metal plate mounted on said female die holder when the clamping member has been moved towards said female die holder, shearing means operable separately from the male bending die holder and the clamping means and mounted for pivotal movement relative to the frame behind the clamping means, means for effecting said pivotal movement of the shearing means independently of movement of the male bending die holder and the clamping means, said shearing means having a transversely extending cutting member with a first cutting edge, said female bending die holder having a second transversely extending cutting edge at the rear thereof, and said shear pivoting means being operable to move the cutting member downwardly to cause such first cutting edge to engage the metal plate behind the clamping devices, when said clamping devices are clampingly engaged with the metal plate, and cooperate with said second cutting edge to cut through the metal plate.

2. A bending and cutting machine according to claim 1 wherein said clamping means is mounted for pivotal movement relative to the frame.

3. A bending and cutting machine according to claim 2 wherein said clamping means and said shearing means are mounted for pivotal movement about a common pivotal axis.

4. A bending and cutting machine according to claim 1 wherein said clamping means is mounted for substantially vertical movement relative to the frame.

5. A bending and cutting machine according to claim 1 wherein said shearing means is mounted for pivotal movement on the frame by adjustable eccentric pivoting means which is adjustable to vary the position of the first cutting edge on the transverse cutting member in accordance with the thickness of the metal plate to be cut.

* * * * *